United States Patent
Atherton

(10) Patent No.: US 8,381,991 B2
(45) Date of Patent: Feb. 26, 2013

(54) RADIO FREQUENCY IDENTIFICATION TAG WITH PRIVACY AND SECURITY CAPABILITIES

(75) Inventor: Peter Samuel Atherton, Leesburg, VA (US)

(73) Assignee: Mikoh Company, McLean, VA (US)

( * ) Notice: Subject to any disclaimer, the term of this patent is extended or adjusted under 35 U.S.C. 154(b) by 142 days.

(21) Appl. No.: 12/519,666

(22) PCT Filed: Dec. 18, 2006

(86) PCT No.: PCT/AU2006/001920
§ 371 (c)(1),
(2), (4) Date: Sep. 21, 2009

(87) PCT Pub. No.: WO2008/074050
PCT Pub. Date: Jun. 26, 2008

(65) Prior Publication Data
US 2010/0230498 A1 Sep. 16, 2010

(51) Int. Cl.
*G06K 19/06* (2006.01)

(52) U.S. Cl. ........ 235/492; 235/375; 235/451; 235/487; 235/488

(58) Field of Classification Search .......... 235/375, 235/380, 451, 492; 340/10.1, 10.2, 572.1, 340/572.2, 572.7; 343/700 M
See application file for complete search history.

(56) References Cited

U.S. PATENT DOCUMENTS

| | | | |
|---|---|---|---|
| 5,165,725 A * | 11/1992 | Gollon | 283/81 |
| 6,278,413 B1 | 8/2001 | Hugh et al. | |
| 6,774,865 B1 | 8/2004 | Serra | |
| 6,888,509 B2 | 5/2005 | Atherton | |
| 7,631,812 B2 * | 12/2009 | Williams et al. | 235/487 |
| 2003/0080917 A1 | 5/2003 | Adams et al. | |
| 2004/0066296 A1 * | 4/2004 | Atherton | 340/572.1 |
| 2005/0093678 A1 * | 5/2005 | Forster et al. | 340/10.1 |
| 2006/0043198 A1 | 3/2006 | Forster | |
| 2006/0080819 A1 * | 4/2006 | McAllister | 29/403.3 |
| 2006/0237544 A1 * | 10/2006 | Matsuura et al. | 235/492 |

FOREIGN PATENT DOCUMENTS

| | | |
|---|---|---|
| EP | 1 527 413 B1 | 5/2005 |
| JP | 2003-263620 A | 9/2003 |
| JP | 2006-148462 A | 6/2006 |
| WO | WO 00/59067 A2 | 10/2000 |
| WO | WO 2004/012138 A1 | 2/2004 |
| WO | WO 2005/045754 A1 | 5/2005 |
| WO | WO 2006/021914 A1 | 3/2006 |

OTHER PUBLICATIONS

International Search Report (PCT/ISA/210) dated Mar. 1, 2007.
Extended Search Report issued Mar. 2, 2010 by the European Patent Office in European Patent Application No. 06817617.1.

* cited by examiner

*Primary Examiner* — Tuyen K Vo
(74) *Attorney, Agent, or Firm* — Buchanan Ingersoll & Rooney PC

(57) ABSTRACT

An RFID tag that is foldable about a generally transverse fold line. The line divides the tag into two regions. One region has an RFID integrated circuit and areas of electrically conductive material. The other region has conductive areas that provide an efficient RFID antenna. In a folded configuration the areas are operatively associated with the integrated circuit while in the open configuration the areas are not functionally associated with the integrated circuit. Accordingly in the open configuration the tag is disabled or its RFID performance substantially degraded. The tag can be reversibly altered between the open and folded configurations.

13 Claims, 5 Drawing Sheets

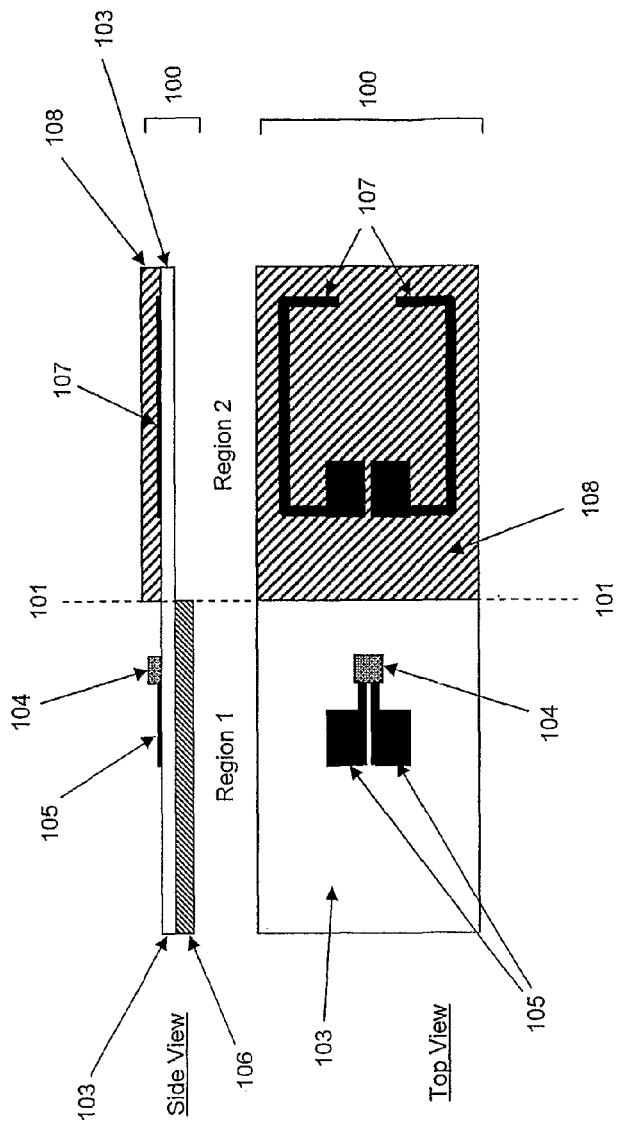
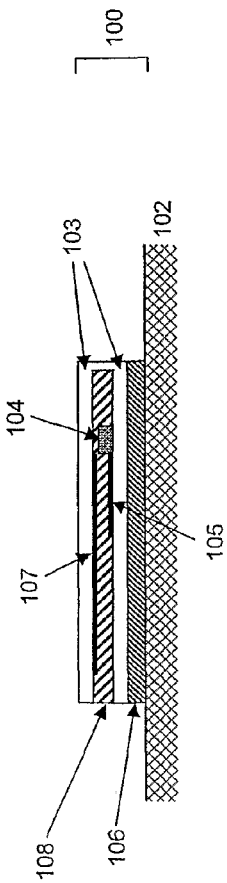
Figure 1A
Figure 1B
FIGURE 1

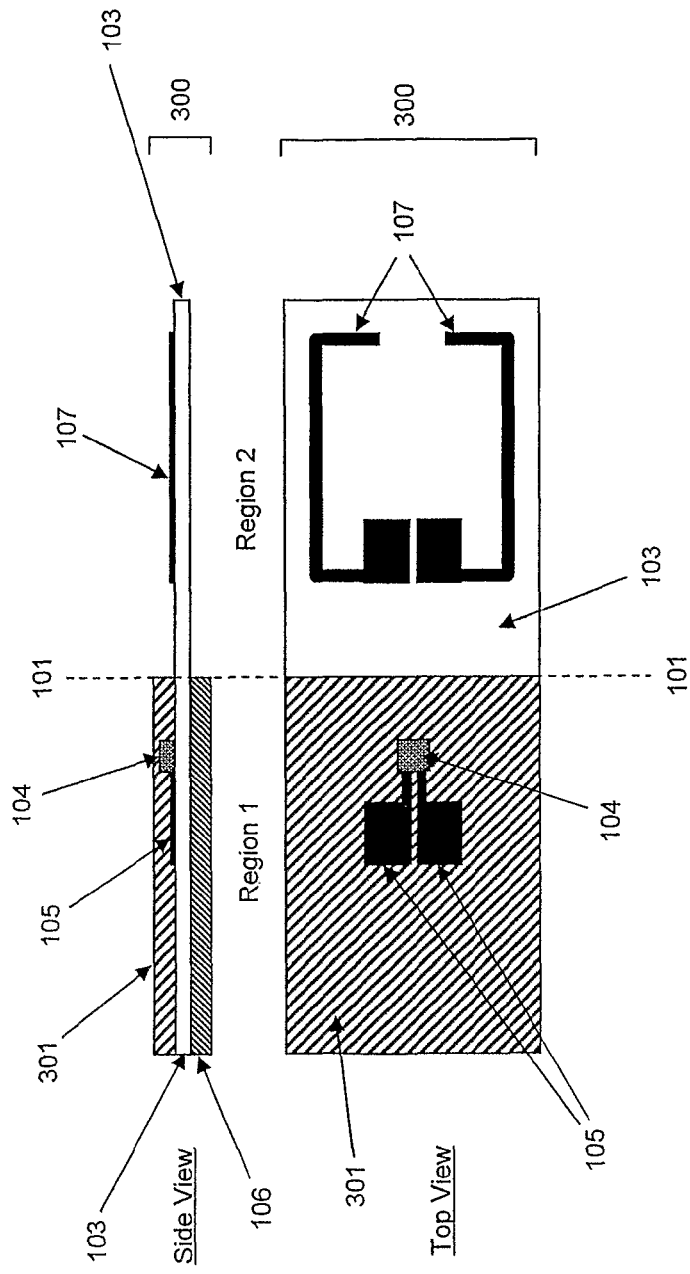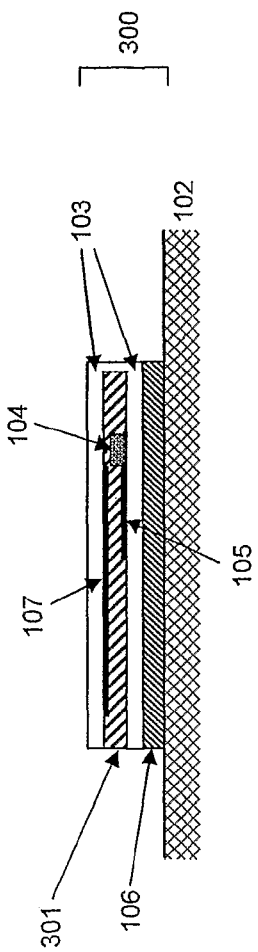
Figure 3A
Figure 3B
FIGURE 3

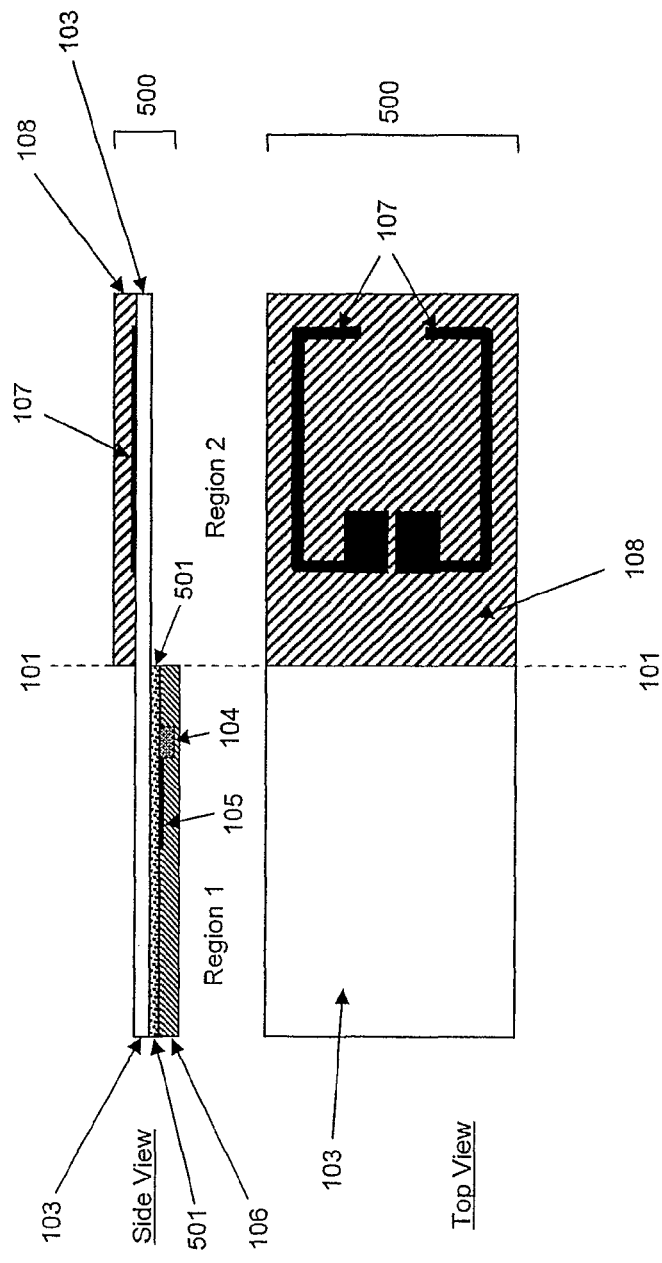
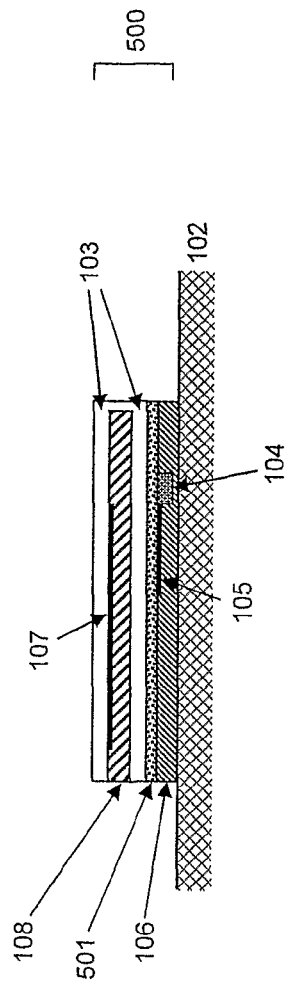
Figure 5A
Figure 5B
FIGURE 5

RADIO FREQUENCY IDENTIFICATION TAG WITH PRIVACY AND SECURITY CAPABILITIES

BACKGROUND TO THE INVENTION

Low-cost passive radio frequency identification (RFID) tags are expected to be used in the future to identify and track various items, including consumer products. A typical passive RFID tag includes a thin, flexible substrate to which is applied an RFID integrated circuit (or chip) and radio frequency (RF) antenna. The RF antenna is coupled to the RFID chip and enables communication between the RFID chip and a remote RFID reading device. The tags usually include an attachment means—typically a layer of pressure-sensitive adhesive—to attach the tag to an item. The RFID chip incorporates an electronic memory that typically stores a unique chip identification code and may also have additional storage capability for other data.

RFID technology provides several key advantages over existing automated identification technologies (such as bar-code technology), including:
 the ability to read an RFID tag from a distance without requiring line-of-sight access to the tag;
 the ability to read multiple RFID tags at high speed;
 (depending on the type of RFID chip) the ability to write information to an RFID tag.

An issue that has arisen regarding the use of RFID tags on consumer goods is the privacy of the consumer. One concern is that it may be possible for an RFID tag on a tagged item to be read after the item has been purchased and without the consumer being aware that reading of the tag has occurred. This may violate the privacy rights of consumers by allowing their shopping habits, movements, or product usage habits to be monitored.

One solution is to destroy or permanently disable the RFID tag after purchase of the tagged consumer item. While this would resolve the privacy concerns, it would have the disadvantage that if the consumer item is returned the store will no longer be able to use the RFID tag to identify it.

Other solutions have been proposed, in which the RFID performance of the tag can be permanently degraded after the tagged item is purchased, such that the RFID tag can still be read but only from a very short distance, thereby practically speaking preventing any tracking of a tagged item after the tag has been so modified. While this type of solution would resolve the privacy concern, and would allow returned items to be identified by means of the RFID tag, it would have the disadvantage that returned items could not be further processed through a retailer's RFID system due to the limited read distance of the modified tag, and so the returned item would in all probability need to be retagged.

A further disadvantage of using standard RFID tags to identify consumer products is that standard RFID tags do not incorporate any physical security features and so can easily be transferred from one item to another without their RFID function being affected. Consequently, after purchase of an item its RFID tag may be transferred to another item that is then brought back to the retailer as a product return. If the RFID tag is used to identify the returned item the store may issue a credit against the wrong item.

OBJECT OF THE INVENTION

The object of the present invention is to overcome or substantially ameliorate the above disadvantages.

SUMMARY OF THE INVENTION

There is disclosed herein an RFID tag including:
 a substrate;
 an RFID integrated circuit secured to said substrate;
 an RFID antenna also secured to said substrate; and
 wherein said tag is arrangeable in a first configuration in which said integrated circuit and said antenna are operatively electrically coupled to provide an RFID function, and a second configuration in which electric coupling of said antenna and circuit is altered to change said function, with said tag being alterable from said first configuration to said second configuration, and from said second configuration to said first configuration to at least partly reverse said change to said function.

Preferably, said function is degraded or disabled when said tag is in said second configuration, relative to said function when said tag is in said first configuration.

Preferably, when said antenna is operatively electrically coupled to said integrated circuit, conductive coupling is not included.

Preferably, said antenna is operatively electrically coupled to said integrated circuit via capacitive coupling or inductive coupling.

Preferably, said tag is a passive RFID tag.

Preferably, said tag is an active or semi-active RFID tag.

Preferably, said RFID tag includes a power source.

Preferably, said substrate is folded back upon itself when said tag is rearranged from said second configuration to said first configuration, so as to change from an open configuration to a closed folded configuration.

Preferably, said antenna is located adjacent to said integrated circuit in said first configuration, and displaced from said integrated circuit in said second configuration.

Preferably, said tag includes an adhesive to releasably retain the tag in the first configuration.

Preferably, said tag includes a tamper indicating feature that degrades said function when said tag is removed from an object to which it is attached.

Preferably, coupling of said antenna and circuit is disrupted permanently when said tag is removed from an object to which it is attached.

Preferably, said tag is rectangular with a longitudinal axis, with the tag being folded transverse of said axis between the first and second configurations.

BRIEF DESCRIPTION OF THE FIGURES

FIG. 1 is a schematic illustration of an RFID tag with modifiable RFID performance;

FIG. 3 is a schematic illustration of a second embodiment of an RFID tag with modifiable RFID performance;

FIG. 5 is a schematic illustration of an RFID tag with both modifiable RFID performance and tamper-indication security, the tamper indication feature being such that the RFID function of the tag is irreversibly disabled or substantially degraded if the tag is removed from a surface to which it has been applied.

DESCRIPTION OF THE INVENTION

Figure 2:
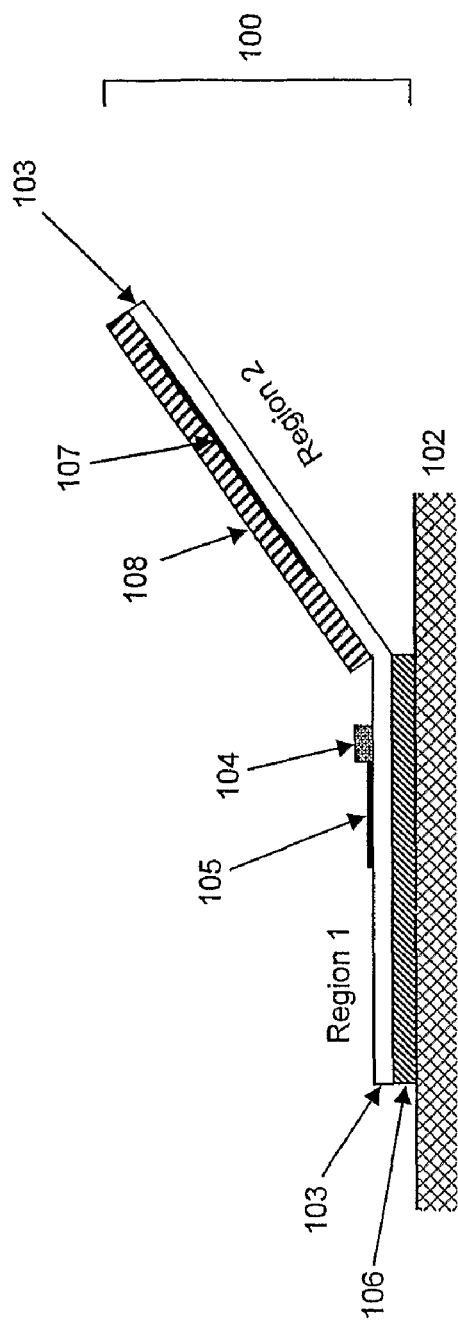
FIG. 2 is a schematic illustration of the RFID tag of FIG. 1 in an opened configuration after application to a surface, such that its RFID performance is disabled or substantially degraded relative to the performance of the tag in a closed configuration.

The present invention will now be described by way of non-limiting example with reference to the embodiments illustrated schematically in FIGS. 1 to 5.

FIG. 1 is a schematic illustration of an RFID tag that is the subject of the present invention.

The RFID tag 100 of FIG. 1 is produced initially in the form of a flat rectangular tag having a longitudinal axis, as shown in FIG. 1A. The flat tag of FIG. 1A is folded along a fold line 101 that is transverse of the longitudinal axis into the folded configuration of FIG. 1B that is applied to a surface 102.

The fold line 101 divides the RFID tag into two regions— region 1 and region 2—as illustrated in FIG. 1A. Regions 1 and 2 do not need to be the same size and shape.

The preferred embodiment of FIG. 1 is described and illustrated in relation to an RFID tag that incorporates a radio frequency (RF) antenna to enable communication with a remote RFID reading device. It should be appreciated that the antenna design shown in FIG. 1 is illustrative only, and that various different designs of RFID tag antenna may be used while still embodying the invention described herein.

At some radio frequencies RFID tags use so-called near-field effects to communicate with a reading device, and incorporate an induction coil antenna in the RFID tag instead of a more conventional RF antenna (such as, for example, a dipole antenna). As described in more detail below, it should be appreciated that the principles described herein apply equally to RFID tags that use an induction coil antenna.

The unfolded RFID tag configuration illustrated in FIG. 1A comprises a tag substrate 103 to the upper surface of which an RFID integrated circuit, or chip, 104 is attached in region 1 of the tag. At least one area 105 of electrically conducting material is applied to the upper surface of region 1 of the substrate 103 such that the areas 105 of conducting material connect electrically to connection points on the RFID integrated circuit (IC) 104 and extend a distance onto the upper surface of region 1 of the substrate 103. The conducting areas 105 are designed such that on their own they provide a poor antenna for the RFID integrated circuit 104. The substrate is flexible along the fold line 101 to provide for folding.

On the lower surface of region 1 of the substrate 103 an adhesive layer 106 is applied, as illustrated in FIG. 1A. The adhesive layer 106 is preferably a strong or permanent adhesive that attaches the RFID tag 100 to a surface 102.

At least one area 107 of electrically conducting material is applied to the upper surface of region 2 of the substrate 103. A layer of adhesive 108 is applied to the upper surface of the substrate 103 in region 2 over the areas 107 of conducting material.

The open RFID tag 100 illustrated in FIG. 1A is folded along the fold line 101 to produce the working RFID tag 100 illustrated in FIG. 1B. The tag substrate 103 may be perforated or modified in some way along the fold line 101 so as to promote folding along the fold line 101. The folded RFID tag 100 is attached to a surface 102 by means of the adhesive layer 106.

After the tag 100 is folded into the configuration illustrated in FIG. 1B at least a portion of the conducting areas 107 is brought into close proximity with at least a portion of the electrically conducting areas 105, resulting in the conducting areas 105 and 107 being electrically coupled to each other by means of a non-contact coupling method such as capacitive coupling or inductive coupling. The conducting areas 107 are configured such that when coupled to the conducting areas 105, they provide an efficient RFID antenna for the RFD) integrated circuit 104, and the RFID tag 100 thereby becomes functional when it is folded as illustrated in FIG. 1B. The tag 100 may be supplied in this folded configuration. It should be appreciated that a non-contact coupling method is proposed for coupling conducting areas 105 to conducting areas 107, so that actual physical contact of the areas 105 and 107 is not required.

In the schematic illustration of FIG. 1A two separate conducting areas 105 and two separate conducting areas 107 are shown. When the tag 100 is folded as illustrated in FIG. 1B a portion of each of the conducting areas 107 is directly adjacent to a portion of one of the conducting areas 105. If the conducting areas 105 and 107 are designed correctly, this will enable capacitive coupling between adjacent conducting areas 105 and 107, thereby coupling the conductive areas 105 and 107 and forming an efficient RFID antenna for the RFID integrated circuit 104. This type of design may be employed, for example, in the case of UHF RFID tags—such as the so-called EPC (Electronic Product Code) tags—operating at a frequency of around 900 MHz.

The RFID function of the RFID tag 100 can be deliberately disabled, or at least substantially degraded, by simply lifting region 2 of the folded RFID tag 100 away from region 1, as illustrated in FIG. 2. When the tag is partly unfolded in this way, the conducting areas 107 are removed a distance from the conducting areas 105 and the efficiency of the electrical coupling between conducting areas 105 and 107 is thereby reduced. The RFID integrated circuit 104 therefore is no longer coupled to an efficient RF antenna within the RFID tag 100, and the RFID function of the tag 100 is disabled or substantially degraded. Generally speaking, the efficiency of non-contact coupling methods diminishes rapidly as the distance between the coupled electrically conducting areas increases, so the RFID tag 100 does not need to be opened far before its RFID function is substantially diminished.

Folding region 2 of the RFID tag 100 back down onto region 1 restores the RFID function of the tag by again bringing conducting areas 105 and 107 into close proximity.

Preferably the adhesive layer 108 is re-attachable, so that region 2 of the RFID tag 100 can be folded and attached to region 1 of the RFID tag 100 a number of times—in other words, the RFID tag 100 can be folded and unfolded a number of times.

Figure 4:
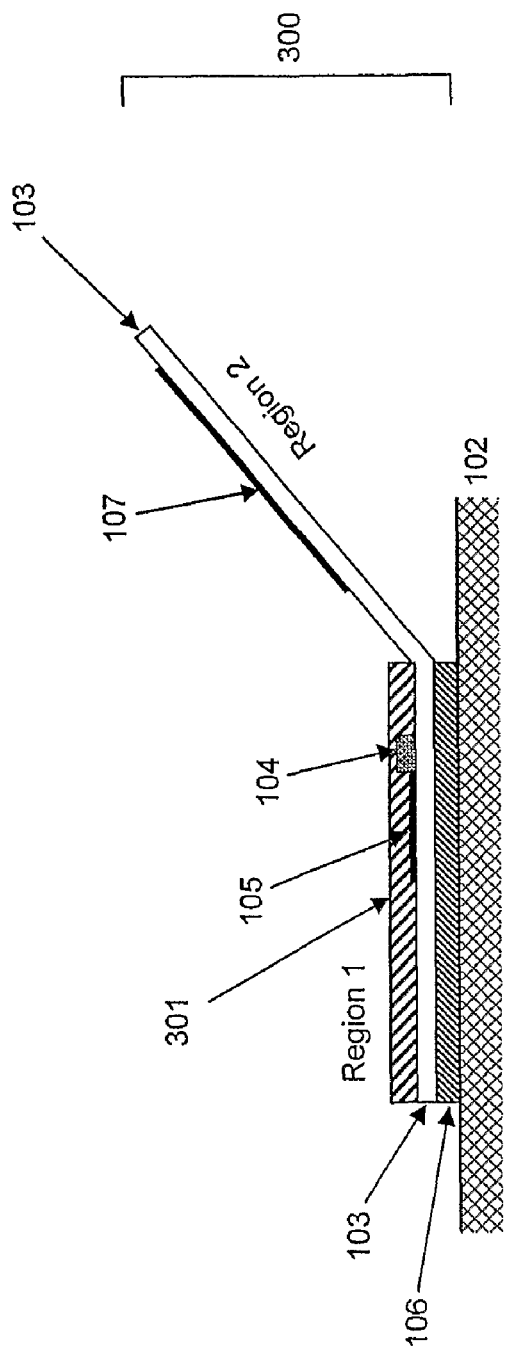
FIG. 4 is a schematic illustration of the RFID tag of FIG. 3 in an opened configuration after application to a surface, such that its RFID performance is disabled or substantially degraded relative to the performance of the tag in a closed configuration.

FIG. 3 illustrates an RFID tag 300 that is a variation on the preferred embodiment illustrated in FIG. 1. In the embodiment of FIG. 3 the adhesive layer 108 of FIG. 1 is absent and instead an adhesive layer 301 is applied uniformly to the upper surface of region 1 of the substrate 103 over the RFID integrated circuit 104 and conducting areas 105. As illustrated in FIG. 3B, region 2 of the substrate 103 is folded over and applied to the top of the adhesive layer 301 in order to couple the conducting areas 105 to the conducting areas 107 and thereby enable the RFID function of the RFID tag 300. The folded RFID tag 300 illustrated in FIG. 3B is similar to the folded RFID tag 100 illustrated in FIG. 1B. As in the case of the RFID tag embodiment illustrated in FIGS. 1 and 2, the RFID function of the folded RFID tag 300 can be deliberately disabled or substantially degraded by lifting region 2 of the substrate 103 away from region 1 (i.e. by lifting region 2 of substrate 103 away from the adhesive layer 301), as illustrated in FIG. 4. As in the embodiment of FIGS. 1 and 2, preferably the adhesive layer 301 is a re-attachable adhesive, so that region 2 of the substrate 103 can be lifted away from and reapplied to the adhesive layer 301 a number of times.

It should be appreciated that numerous variations are possible on the embodiments described in relation to FIGS. 1 to 4. Non-limiting examples of such variations are provided below.

RFID tag antenna designs (including induction coil RFID antenna designs) different from those described in relation to FIGS. 1 to 4 may be employed.

Different methods may be used to attach region 2 of the RFID tag 100 or 300 to region 1 of the RFID tag 100 or 300 to enable the RFID function of the tag.

Region 2 of the RFID tag 100 or 300 may have a form factor (size and shape) that is different from region 1 of the RFID tag 100 or 300—it is not necessary for region 2 to match region 1.

As described above, the preferred embodiments illustrated in FIGS. 1 to 4 use a so-called far-field RF antenna in the tag. Some RFID tags—for example, tags that operate in the so-called low frequency (around 100 kHz) and high frequency (around 13 MHz) bands—instead use near-field techniques to enable communication between the RFID tag and a reader. In this case the RFID tag may use an induction coil antenna to enable communication between the RFID tag and a reader. It should be appreciated that the principles described herein apply equally to RFID tags that use an induction coil antenna and to RFID tags that use any of the far-field antenna designs (such as, for example, a dipole antenna). In the case of an induction coil antenna the conductive areas 105 may be configured to form a single induction coil connected via two connection points to the RFID integrated circuit 104. The conductive areas 107 may then be configured to form a second induction coil that couples inductively to the induction coil formed by the areas 105 when the RFID tag 100 or 300 is folded closed as illustrated in FIGS. 1B and 3B. The induction coil 107 thereby couples to the RFID integrated circuit 104 via the induction coil 105, and is configured to enable communication to a remote RFID reading device. Since the communication range using an induction coil antenna is dependant (among other factors) on the area of the coil, the induction coil 105 would preferably be small and allow coupling to the induction coil 107 over only a very short distance, and would not enable communications to a remote RFID reading device. On the other hand the induction coil 107 would preferably be larger in overall area so as to enable communication with a remote RFID reading device. As described in relation to the embodiments of FIGS. 1 to 4; when region 2 of the RFID tag 100 or 300 is folded over and brought into close proximity to region 1 of the RFID tag 100 or 300, induction coil 105 will couple inductively to induction coil 107, thereby coupling the RFID integrated circuit 104 to an efficient RFID antenna and enabling the RFID function of the tag 100 or 300. Similarly, when region 2 of the RFID tag 100 or 300 is lifted away from region 1 of the RFID tag 100 or 300 the induction coil 105 no longer couples efficiently to induction coil 107 and the RFID function of the tag 100 is either disabled completely or substantially degraded.

In another variation on the embodiments of FIGS. 1 to 4 the RFID tag may include a tamper indicating feature such that the RFID function of the tag is disabled in a non-reversible manner if the tag is removed from a surface 102 to which it has been applied. Such a tamper indicating feature is useful in ensuring that the RFID tag cannot be moved from one item to another without its RFID function being disabled or degraded in a way that is not readily reversible.

One preferred embodiment for providing the above described tamper indicating capability will now be described by way of a variation on the RFID tag 100 of FIGS. 1 and 2. This tamper indicating technique for RFID tags is described in detail in U.S. Pat. No. 6,888,509, but has not previously been presented in combination with the modifiable RFID tag performance invention described herein. Modifiable RFID tag performance (as described in relation to the embodiments of FIGS. 1 to 4) and RFID tamper indication are complementary features that when used together each enhance the value of the other to an end user. It should be appreciated that the tamper indicating capability described below can be applied to the RFID tag embodiment of FIGS. 3 and 4 or other RFID tag embodiments described herein, or to other RFID tag embodiments that incorporate the modifiable RFID tag performance capability described herein.

FIG. 5 is an illustration of an RFID tag 500 that is a variation on the RFID tag embodiment of FIGS. 1 and 2. The RFID tag 500 is similar to the RFID tag 100 except that in the case of the RFID tag 500 the RFID integrated circuit 104 and electrically conducting areas 105 are applied to the lower surface of region 1 of the substrate 103 and covered by the adhesive layer 106. When the RFID tag 500 is in its folded configuration and is therefore functional, as illustrated in FIG. 5B, the conducting areas 105 couple to the conducting areas 107 through both the adhesive layer 108 and the substrate material 103. In the embodiment of FIG. 5 the objective is to ensure that if the tag 500 is removed from a surface 102 to which it has been applied, at least either the conductive areas 105 or connection between the conductive areas 105 and the integrated circuit 104 will be disrupted so as to disable or substantially degrade the coupling between conducting areas 105 and 107 or between the integrated circuit 104 and the conductive areas 107, thereby disabling or substantially degrading the RFID function of the RFID tag 500.

In one preferred embodiment of the RFID tag 500 the conducting areas 105 are formed using a destructible electrically conductive material, such as conductive ink. Other destructible electrically conducting materials may be used instead. To promote damage or disruption to the conductive areas 105 if the tag 500 is removed from the surface 102, one or more adhesion modifying layers 501 may be applied between the substrate 103 and the adhesive layer 106 at least in the vicinity of the conducting areas 105 so as to modify the relative adhesion of the substrate 103, the conductive areas 105, and the adhesive layer 106 in order to result in damage or disruption to the conducting areas 105 on removal of the tag 500 from the surface 102. In FIG. 5 the adhesion modifying layers 501 (there may be one or more such layers) are shown between the substrate 103 and the conductive areas 105, but it should be appreciated that the adhesion modifying layers 501 may instead or also be applied between the conductive areas 105 and the adhesive layer 106. The adhesion modifying layers 501 may be applied in a specified pattern (as viewed from below the substrate 103) so as to create a plurality of areas of differing relative adhesion strengths and thereby promote disruption or damage to the conductive areas 105 if the tag 500 is removed from the surface 102. Where present, the adhesion modifying layer 501 modifies adhesion of the layers that it separates. The adhesion modifying layer 501 may either enhance or reduce the adhesion of two layers that it separates. Preferably, but not necessarily, the adhesion modifying layer 501 will reduce the adhesion of two layers that it separates. In the preferred embodiment illustrated in FIG. 5 an adhesion modifying layer 501 is applied in a specified pattern between the substrate 103 and conductive areas 105, reducing adhesion of the electrically conductive areas 105 to the substrate 103 in those areas where the adhesion modifying layer 501 is applied, and in those areas thereby promoting separation of the conductive areas 105 from the substrate 103 if the tag 500 is removed from the surface 102. Removing all or part of the conductive areas 105 from the lower surface of the substrate 103 would disable or substantially degrade coupling between the conducting areas 105 and conducting areas 107, thereby disabling or substantially degrading the RFID performance of the RFID tag 500. In a variation on this embodiment, the adhesion modifying layer 501 may comprise a treatment on the lower surface of the substrate 103, applied either uniformly or in a specified pattern, such that in the treated areas the adhesion to the substrate 103 of an adjacent layer is modified, either by being increased or by being decreased, relative to the adhesion of the adjacent layer to the substrate 103 in areas where the surface treatment has not been undertaken. In another variation on the embodiment of FIG. 5, the adhesion modifying layer 501 may be applied between the substrate 103 and RFID integrated circuit 104 in addition to being applied between the substrate 103 and conducting areas 105, such that if the RFID tag 500 is removed from the surface 102 the RFID integrated circuit 104 will be removed from the substrate 103 in addition to the conducting areas 105 being separated from the substrate 103 in those areas where the adhesion modifying layer 501 is applied. In another variation on the embodiment of FIG. 5 the RFID integrated circuit 104 may be applied to the upper surface of the substrate 103 and either directly connected or coupled to the conducting areas 105 on the lower surface of the substrate 103, with the conducting areas 105 being coupled to the conducting areas 107 when the RFID tag 500 is in the folded configuration shown in FIG. 5B, thereby enabling the RFID function of the RFID tag 500, as described above.

It should be appreciated that the tamper indicating capability described in relation to the RFID tag 500 of FIG. 5 can also be applied to other RFID tag designs with modifiable RFID performance, including the RFID tag design illustrated in FIGS. 3 and 4 and other RFID tag designs described herein.

In alternative forms the RFID tags 100, 300 or 500 are active or semi-active RFID tags having an on-board power source such as a battery.

In the embodiment of FIGS. 1 to 5, the integrated circuit 104 and conductive areas 105 are in region 1 and the conductive areas 107 are in region 2, with region 1 being affixed to a surface 102 in order to apply RFID tag 100, 300 or 500 to an object. In a variation on all of the embodiments of FIGS. 1 to 5, the conductive areas 107 are instead in region 1, with the integrated circuit 104 and conductive areas 105 in region 2. In this variation on the preferred embodiment of FIG. 5, the conductive areas 107 are on the bottom surface of the substrate 103 along with the adhesion modifying layers 501, as described in relation to FIG. 5.

The invention claimed is:
1. An RFID tag including:
a substrate;
an RFID integrated circuit secured to said substrate; an RFID antenna also secured to said substrate; and wherein said tag is arrangeable in a first configuration in which said integrated circuit and said antenna are operatively electrically coupled to provide an RFID function, and a second configuration in which electric coupling of said antenna and circuit is altered to change said function, with said tag being alterable from said first configuration to said second configuration, and from said second configuration to said first configuration to at least partly reverse said change to said function, wherein said tag includes an adhesive to retain the tag in the first configuration, and wherein the adhesive is releasable to allow the tag to be rearranged from the first configuration to the second configuration and re-attachable to allow the tag to again be retained in the first configuration after being rearranged from the first configuration to the second configuration.

2. The tag of claim 1, wherein said function is degraded or disabled when said tag is in said second configuration, relative to said function when said tag is in said first configuration.

3. The tag of claim 1, wherein when said antenna is operatively electrically coupled to said integrated circuit, conductive coupling is not included.

4. The tag of claim 1, wherein said antenna is operatively electrically coupled to said integrated circuit via capacitive coupling or inductive coupling.

5. The tag of claim 1, wherein said tag is a passive RFID tag.

6. The tag of claim 1, wherein said tag is an active or semi-active RFID tag.

7. The tag of claim 6, wherein said RFID tag includes a power source.

8. The tag of claim 1, wherein said substrate is folded back upon itself when said tag is rearranged from said second configuration to said first configuration, so as to change from an open configuration to a closed folded configuration.

9. The tag of claim 1, wherein said antenna is located adjacent to said integrated circuit in said first configuration, and displaced from said integrated circuit in said second configuration.

10. The tag of claim 1, wherein said tag includes a tamper indicating feature that degrades said function when said tag is removed from an object to which it is attached.

11. The tag of claim 1, wherein coupling of said antenna and RFID integrated circuit is disrupted permanently when said tag is removed from an object to which it is attached.

12. The tag of claim 1, wherein said tag is rectangular with a longitudinal axis, with the tag being folded transverse of said axis between the first and second configurations.

13. The tag of claim 1, further comprising a second adhesive for attaching the tag to a surface.

* * * * *